United States Patent [19]

Kenmochi et al.

[11] 3,869,665
[45] Mar. 4, 1975

[54] DEVICE FOR DETECTING CORONA DISCHARGE IN AN ENCLOSED ELECTRIC DEVICE

[75] Inventors: Hiroshi Kenmochi, Fujisawa; Shinichi Menju, Atsugi; Kunio Takahashi, Yokohama, all of Japan

[73] Assignees: Tokyo Shibaura Co., Ltd., Kawasaki-shi; Tokyo Electric Power Co., Ltd., Tokyo, both of, Japan

[22] Filed: Nov. 8, 1973

[21] Appl. No.: 413,973

[30] Foreign Application Priority Data
Nov. 10, 1972 Japan.............................. 47-112641

[52] U.S. Cl..................... 324/72, 324/54, 324/133
[51] Int. Cl....................... G01r 31/02, G01r 31/12
[58] Field of Search ................ 324/72, 54, 126, 133

[56] References Cited
UNITED STATES PATENTS
2,996,664  8/1961  Vogel et al. ...................... 324/72 X
3,513,394  5/1970  Tachick .............................. 324/133
3,524,133  8/1970  Arndt................................ 324/126 X
3,524,178  8/1970  Stratton .......................... 324/133 X

*Primary Examiner*—Alfred E. Smith
*Assistant Examiner*—Rolf Hille
*Attorney, Agent, or Firm*—Flynn & Frishauf

[57] ABSTRACT

In an enclosed electric device in which a conductor to be charged with a voltage is supported by an insulation support in its enclosing metal case, an electrode is disposed on or in the insulation support so as to provide a first static capacitance with respect to the conductor and a second static capacitance with respect to the metal case. A corona discharge detector is connected between the electrode and the metal case and adapted to detect, with the first static capacitance used as a coupling capacitor, a corona discharge occurring from the conductor and the insulation support.

3 Claims, 5 Drawing Figures 3,869,665

DEVICE FOR DETECTING CORONA DISCHARGE IN AN ENCLOSED ELECTRIC DEVICE

This invention relates to a corona discharge detecting device, and particularly to a corona discharge detecting device capable of detecting a corona discharge, and its location, occurring on an electric device enclosed within a metal case.

A high tension enclosed electric device is enclosed by supporting its conductor to be charged with a voltage by one end of an insulation support and securing the other end of the insulation support to its enclosing metal case. With an enclosed interrupter of a very high voltage and of a high rated capacity, for example, a very long bus bar is used, and to enclose the bus bar, a plurality of unit bus bars and unit metal cases are often serially assembled on the spot. After the assembly is completed, an insulation gas such as sulfur hexafluoride $SF_6$ is sealed into the metal case assembled serially. The $SF_6$ gas exhibits a better insulation characteristic under a uniform electric field than the other gaseous insulation medium. However, its insulation characteristic is markedly deteriorated under a non-uniform electric field. The disturbance of electric field with the enclosed metal case after assembly is influenced by an assembly technique on the spot, a penetration of water through the serially connected portion of adjacent unit metal cases, or presence of dust, grease, metal particles etc. deposited on the surface of the insulation support during assembly. Even if each unit is satisfactory in a factory test, a corona discharge often occurs, after assembly, on a charged portion, particularly a conductor portion supported by the insulation support, or a flashover takes place on the surface of the insulation support. As a means for detecting such a corona discharge, the customary practice is to apply an AC voltage from a power source through an impedance to between the metal case and the conductor; connect a series circuit, consisting of a coupling capacitor and a detection impedance, in parallel with a static capacitance created between the metal case and the conductor; and measure a voltage across the detection impedance using a corona detector, for example, a corona meter. According to this method, it is necessary that the coupling capacitor be prepared on the spot and that one end of the coupling capacitor be connected directly to the conductor. However, it is only possible to connect one end of the coupling capacitor to one end of a lengthy bus bar which extends through a bushing. Even if detection is made according to such method difficulty is encountered in detecting a location at which a corona discharge occurs. It is also known to acoustically detect a corona discharge using an electrical acoustic converter. However, it is very difficult to detect a corona discharge, and its location, due to poor sensitivity of the converter.

It is accordingly the object of this invention to provide a corona discharge detecting device for an enclosed electric device, capable of easily detecting a corona discharge and its location without the necessity of any particular outer coupling capacitor.

SUMMARY OF THE INVENTION

In an enclosed electric device in which a conductor to be charged with a voltage is supported by an insulation support in its enclosing metal case, a corona discharge detecting device according to this invention comprises an electrode disposed on or in the insulation support so as to provide a first static capacitance relative to the conductor and a second static capacitance relative to the metal case, and a corona discharge detector connected in parallel with the second static capacitance and adapted to detect, with the first static capacitance used as a coupling capacitor, a corona discharge occurring from the conductor and the insulation support.

One end of the insulation may be sandwiched in an airtight manner between the serially connected ends of adjacent unit metal cases and the electrode may be mounted on the outer exposed surface of sandwiched end of the insulation support. An electrode may be embedded in the insulation support at the position near the sandwiched portion. In this case, a conductor is taken out from the electrode for outward connection. In either case, a corona discharge detector is connected between the electrode and the metal case. The electrode can be mounted on said outer exposed surface of said sandwiched portion of the insulation support, only when a corona discharge is measured.

According to this invention, it is not required that a coupling capacitor be prepared on the spot. Furthermore, it is possible to locate a place at which a corona discharge takes place.

DETAILED DESCRIPTION OF ILLUSTRATED EMBODIMENTS

Figure 1:
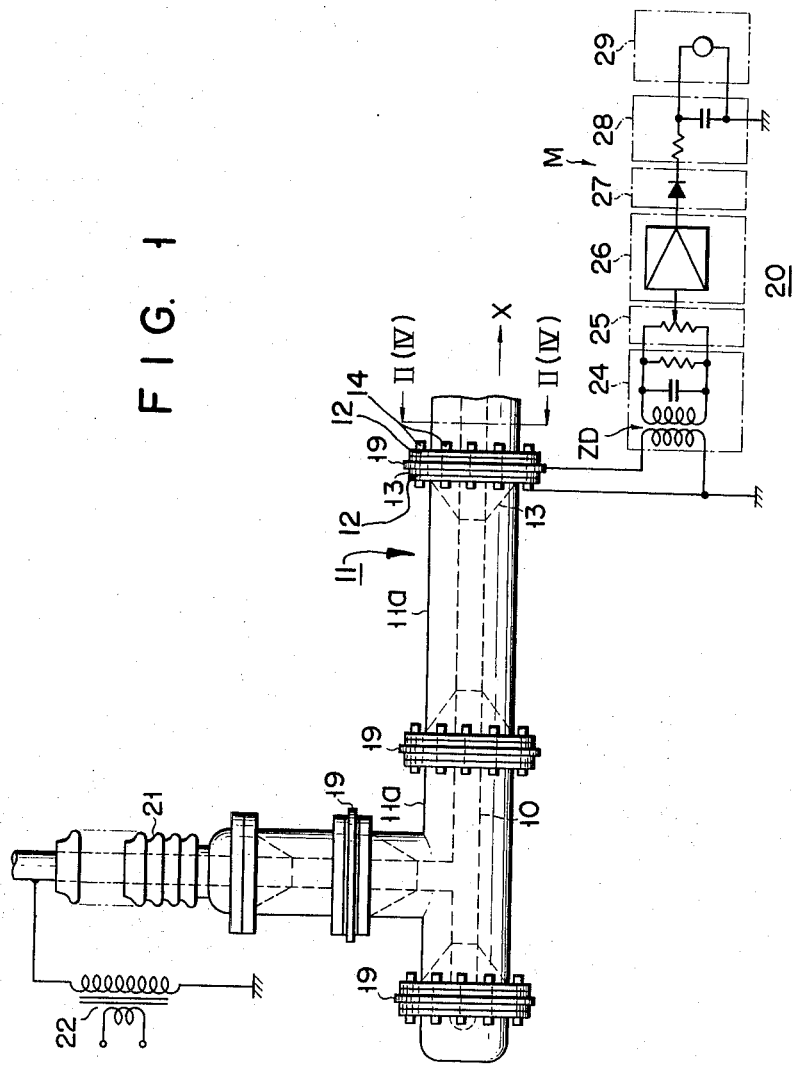
FIG. 1 shows one embodiment according to this invention capable of detecting a corona discharge occurring at the insulation support for a bus bar of an enclosed high tension interrupter.
Figure 2:
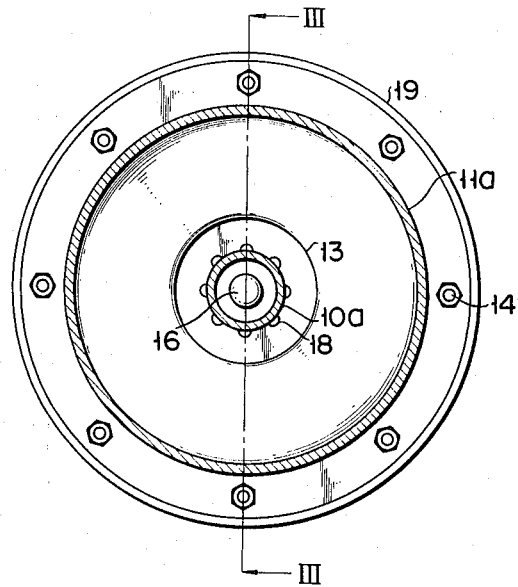
FIG. 2 is an enlarged cross-sectional view taken along line II—II of FIG. 1.
Figure 3:
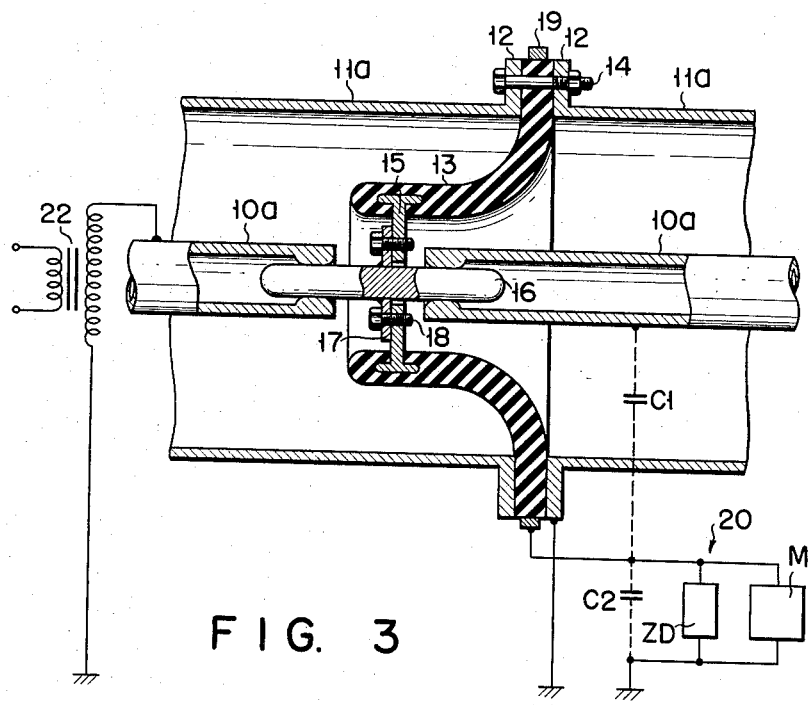
FIG. 3 is a cross-sectional view taken along line III—III of FIG. 2.

In FIGS. 1 to 3, a conductor or a bus bar 10, for example, to be charged with a voltage and a metal case 11 for enclosing the bus bar 10 are extended in the direction of x to be connected to an enclosed electric device (not shown), for example, a high tension interrupter. The metal case 11 includes a plurality of unit metal cases 11a serially coupled together by means of bolts 14 with the outer peripheral end of an insulation support 13 sandwiched between respective end flanges 12 of the adjacent unit metal cases. Near the inner peripheral end of the insulation support 13, the outer peripheral end of a circular metal ring 15 (FIG. 3) is embedded. On the substantially center of a connecting member 16 a flange 17 is secured by welding etc. The flange 17 is secured by bolts 18 to the metal ring 15. The bus bar 10 is also sectionalized into unit bus bars 10a. As shown in FIG. 3 the unit bus bars are serially connected together by inserting one end of the connecting member 16 into the opening end of one unit bus bar and the other end of the connecting member into the opening end of the other unit bus bar, and are supported by the insulation support member 13. Along the outer periphery of the insulation support sandwiched by the flanges 12 an electrode 19, for example, a metal tape, is provided. The unit metal case 11a is grounded. In the above-mentioned arrangement a first static capacitance C1 is formed between the electrode 19 and the bus bar 10 and a second static capacitance C2 is formed between the electrode 19 and the metal case.

After the assembly of the enclosed interrupter is completed as shown in FIG. 1, an insulation gas, for example, sulfur hexafluoride $SF_6$ is filled in the closed case. Where corona discharge is measured, a corona discharge detector 20 comprising a detection impedance ZD and a measuring section M which are in parallel connection is connected between the electrode 19 and the metal case (ground potential) at a serial junction portion of two unit cases 11a. Between the metal case and the bus bar portion derived from a bushing 21 (FIG. 1) a high voltage from a secondary winding of a transformer 22 is applied. Suppose that a corona discharge occurs either on the bus bar portion supported by the insulation support 13 or on the insulation support member. As a corona discharge current is a pulse current very short in its duration and contains frequency components over a wide range of below several M Hz. It is therefore preferred that detection be made by extracting the frequency component present in a specified frequency band. Explanation is now made of one example of the corona discharge detector 20 as shown in FIG. 1. The intermediate frequency component, for example, 500 kHz of a corona current is taken out from a secondary circuit tuning type transformer coupling detection circuit 24 (corresponding to the detection impedance ZD as shown in FIG. 3), and an output is attenuated to a proper extent by an attenuator 25 and amplified by a tuning amplifier 26. The output of the amplifier is detected through a detection circuit 27 and shaped by a pulse shaping circuit 28, and said corona discharge is detected by an indicator 29 such as a potentiometer, oscilloscope etc.

As is evident from FIG. 3 the first static capacitance C1 serves as a coupling capacitance to a corona detector 20. When a corona discharge occurs at the insulation support member 13, a corona current is flowed through the detection impedance ZD through the coupling capacitance C1 (about 0.05 pF), and the generation of a corona discharge can be detected.

Even if the corona detector 20 is connected to an electrode at the insulation support located in a position other than that shown in FIG. 3, when a corona discharge does not occur at this location, then a corona discharge as occurring at the insulation support as shown in FIG. 3 can not be detected due to a low sensitivity of the corona detector. In other words, the location at which a corona discharge occurs can be positively located.

Figure 4:
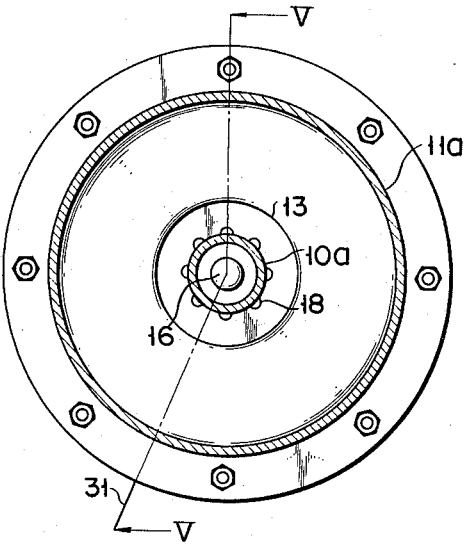
FIG. 4 is an enlarged view of a modification according to this invention taken along line IV—IV of FIG. 1.
Figure 5:
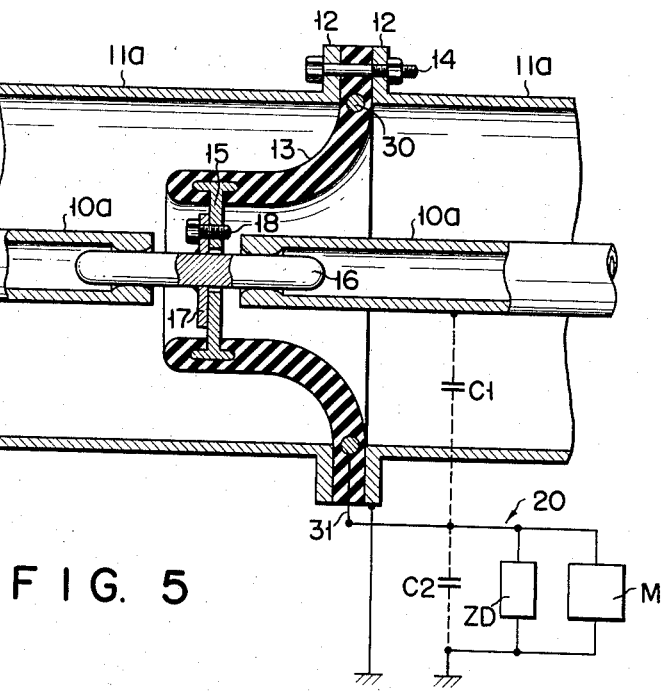
FIG. 5 is a cross-sectional view taken along line V—V of FIG. 4.

There will be explained by reference to FIGS. 4 and 5 another embodiment according to this invention in which like reference numerals as used in the embodiment shown in FIGS. 2 and 3 are employed to denote like parts or elements. With this embodiment, a ring-like electrode 30 is embedded in and near the outer periphery of an insulation supporting body 13 sandwiched between flanges 12, and an outer connection conductor 31 is taken out from this electrode. The conductor 31 is normally connected to a unit metal case 11a and used also to correct a non-uniform electric field distribution within a metal case. When a corona discharge is detected, the conductor 31 is taken out, as shown in FIG. 5, from the metal case and connected to a corona discharge detector 20. The provision of a first static capacitance C1 and a second static capacitance C2 as well as the operation and effect of a corona discharge detecting device is substantially the same as the embodiment shown in FIGS. 1 to 3 and further explanation is omitted.

The kind of the enclosed electric device and the shape of the enclosing metal case should not be taken in a limiting way, as long as they do not depart from the spirit and scope of this invention. Farther, the insulation gas filled into the metal receptacle is not limited to the $SF_6$ gas.

What we claim is:

1. In an enclosed electric device in which a conductor to be charged with a voltage is supported within an enclosing metal case by a plurality of insulation supports spaced apart from each other along said conductor, said enclosing metal case being filled with an insulating gas, a corona discharge detecting device comprising:

a plurality of electrodes each coupled to a respective insulation support for providing a first static capacitance (C1) relative to said conductor and a second static capacitance (C2) relative to said enclosing metal case; and a corona discharge detector adapted to be connected in parallel with said second static capacitance (C2) and to detect, with said first static capacitance (C1) serving as a coupling capacitor, a corona discharge occurring from said conductor and insulation supports.

2. A corona discharge detecting device according to claim 1 wherein:

said metal case includes a plurality of serially connected unit metal cases;

each of said insulation supports is sandwiched in an airtight manner between adjacent unit metal cases at the outer side thereof opposite to the inner side on which said conductor is supported;

said electrodes are provided on the outer exposed surface of said outer side of said respective insulation supports; and said corona discharge detector is adapted to be connected between said electrodes and said metal case.

3. A corona discharge detecting device according to claim 1 wherein:

said metal case includes a plurality of serially connected unit metal cases;

each of said insulation supports is sandwiched in an airtight manner between adjacent unit metal cases at the outer side thereof opposite to the inner side on which said conductor is supported;

said electrodes are embedded near said sandwiched portion and said respective insulation supports, and have respective outer connection conductors taken out therefrom; and said corona discharge detector is adapted to be connected between said outer connection conductors and said metal case.

* * * * *